United States Patent
Karve et al.

(10) Patent No.: US 10,168,946 B2
(45) Date of Patent: *Jan. 1, 2019

(54) EXTENT MIGRATION IN MULTI-TIER STORAGE SYSTEMS

(71) Applicant: INTERNATIONAL BUSINESS MACHINES CORPORATION, Armonk, NY (US)

(72) Inventors: Shrikant V. Karve, Pune (IN); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,948

(22) Filed: Jul. 2, 2018

(65) Prior Publication Data

US 2018/0314459 A1    Nov. 1, 2018

Related U.S. Application Data

(63) Continuation of application No. 15/345,554, filed on Nov. 8, 2016, now Pat. No. 10,042,578.

(51) Int. Cl.
  *G06F 12/00*    (2006.01)
  *G06F 3/06*    (2006.01)

(52) U.S. Cl.
  CPC .......... *G06F 3/0647* (2013.01); *G06F 3/0611* (2013.01); *G06F 3/0653* (2013.01); *G06F 3/0683* (2013.01)

(58) Field of Classification Search
  None
  See application file for complete search history.

(56) References Cited

U.S. PATENT DOCUMENTS

| | | | |
|---|---|---|---|
| 7,539,709 | B1 | 5/2009 | Vengerov et al. |
| 9,330,108 | B2 | 5/2016 | Jones et al. |
| 9,389,801 | B2 | 7/2016 | Jennas, II et al. |
| 9,665,291 | B2 | 5/2017 | Lin et al. |
| 9,927,991 | B2 | 3/2018 | Jain et al. |
| 2010/0131733 | A1 | 5/2010 | Jess |
| 2012/0226859 | A1 | 9/2012 | Lau et al. |

(Continued)

OTHER PUBLICATIONS

IBM, List of IBM Patents or Patent Applications Treated as Related, Appendix P, Jul. 2, 2018, 2 pages.

(Continued)

*Primary Examiner* — John A Lane
(74) *Attorney, Agent, or Firm* — Robert D. Bean

(57) ABSTRACT

Migrating data in a tiered storage system. The tiered storage system includes an upper tier with at least one storage device and a lower tier with at least one storage device. Data on a storage device includes one or more extents, and each extent contains one or more grains. I/O activity of grains is recorded during a predefined time interval. For each extent, a mean heat value over grains in the extent during the predefined time interval is calculated from the recorded I/O activity, where a heat value is a numerical indication of frequency of access of a grain, and a spike heat indicator, which measures non-uniformity of heat values of grains in the extent is calculated. Two extents with mean heat values that differ at most by a predefined threshold are identified, and the extent with a greater spike heat indicator is migrated to an upper tier.

20 Claims, 9 Drawing Sheets

(56) References Cited

U.S. PATENT DOCUMENTS

| | | |
|---|---|---|
| 2013/0013850 A1 | 1/2013 | Baderdinni |
| 2013/0024650 A1 | 1/2013 | Ambat et al. |
| 2014/0208020 A1 | 7/2014 | Benhase et al. |
| 2015/0286418 A1 | 10/2015 | Benhase et al. |
| 2015/0286419 A1 | 10/2015 | Guo et al. |
| 2016/0011803 A1 | 1/2016 | Guo et al. |
| 2016/0162206 A1 | 6/2016 | Bish et al. |
| 2017/0228193 A1 | 8/2017 | Olson et al. |
| 2017/0262216 A1 | 9/2017 | Polkovnikov et al. |
| 2017/0336994 A1 | 11/2017 | Jain et al. |
| 2018/0129443 A1 | 5/2018 | Karve et al. |
| 2018/0136874 A1 | 5/2018 | Karve et al. |

OTHER PUBLICATIONS

Mell et al., "The NIST Definition of Cloud Computing", National Institute of Standards and Technology, Special Publication 800-145, Sep. 2011, pp. 1-7.

EXTENT MIGRATION IN MULTI-TIER STORAGE SYSTEMS

BACKGROUND

The present invention relates generally to data storage systems, and more particularly to migrating extents between tiers in in a multi-tier data storage system.

Modern storage controllers provide a mechanism for managing tiered storage, or storage tiering, which stores different categories of data on different types of storage media. Storage tiers may differ in performance, e.g., in data transfer rate, and cost of the storage media, and data may be categorized by workload, i.e., how often it is accessed. Tiered storage policies generally strive to maintain the most frequently accessed data in the highest performing storage and less frequently accessed data in lower-performance, typically cheaper storage. In addition to cost and performance, other factors, such as data protection and requirements for data recovery, may also be considered. For example, data that is frequently accessed by an application that is sensitive to response time might be stored on one or more solid state drives (SSD). Other data that is infrequently accessed, and for which a longer response time may be acceptable, might be stored on hard disk drives (HDD). However, the cost per gigabyte of storage for SSDs is typically much higher than for HDDs.

A logical volume, also called logical unit number (LUN), is data storage that appears to a user as a single storage device, and which may be accessed using a continuous range of logical block addresses (LBAs), but may actually include multiple physical storage devices of different types. Data on a logical volume is stored as allocation units, or extents, which refers to units of data that are transferred to and from storage devices by storage controllers. An extent may contain one or more grains, which are smaller, configurable units of storage. A grain may be one or more blocks, which are the smallest addressable units of storage on a logical volume, or LUN. While extents may range from higher MBs to lower GBs, grains typically range from few KB s to single digit MBs.

SUMMARY

Embodiments of the present invention disclose a computer-implemented method, system, and computer program product for migrating data in a tiered storage system to improve performance. The tiered storage system includes at least one upper tier and one lower tier, and at least one storage device is assigned to an upper tier and at least one storage device is assigned to a lower tier. Data on a storage device includes one or more extents, and each extent contains one or more grains. I/O activity of grains in extents of storage devices of the tiered storage system is recorded during a predefined time interval, wherein a grain is a single block or a predefined number of blocks. For each extent, a mean heat value over grains in the extent during the predefined time interval is calculated from the recorded I/O activity, where a heat value of a grain is a numerical indication of frequency of access of the grain, and a spike heat indicator, which provides a numerical measure of non-uniformity of heat values of grains in the extent is calculated from the recorded I/O activity by smoothing consecutive heat values of grains in the extent by approximating the heat values with a smooth function, performing peak detection to identify peaks in the smoothed consecutive heat values, and computing spike heat indicators by summing magnitudes of second derivatives at the identified peaks or magnitudes of variations of first derivatives at the identified peaks. Two extents in a lower tier with mean heat values that differ at most by a predefined threshold are identified, and the extent with a greater spike heat indicator is migrated to an upper tier, where an upper tier comprises one or more solid state drive (SSD) storage devices, and where a lower tier comprises one or more of hard disk drives (HDD) storage devices, tape drives, and cloud storage. Two extents in an upper tier with mean heat values that differ at most by a predefined threshold are identified, and the extent with a lesser spike heat indicator is migrated to a lower tier.

DETAILED DESCRIPTION

Figure 1:
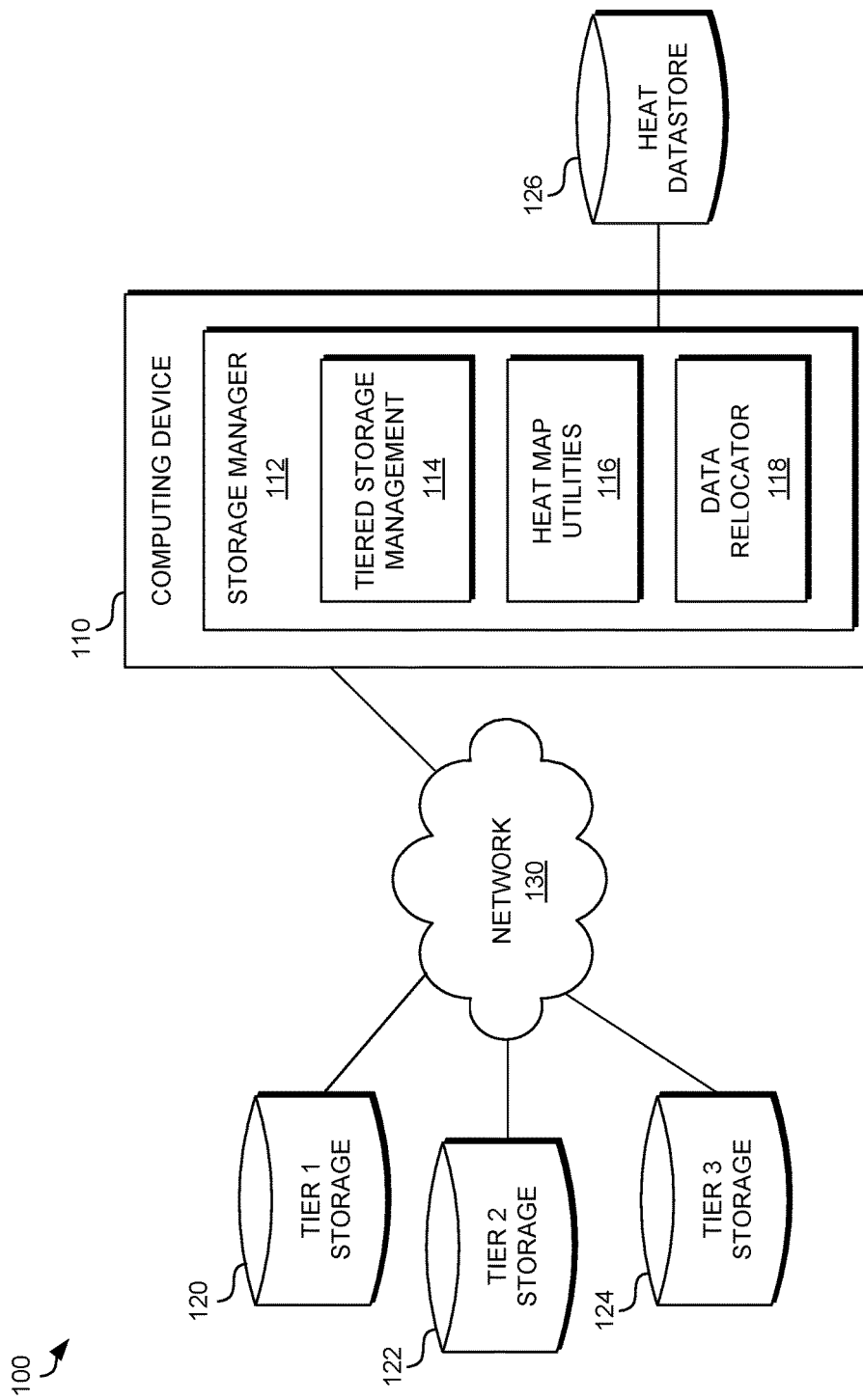
FIG. 1 is a functional block diagram of an automated storage tiering system, in accordance with an embodiment of the present invention.

Multi-tier storage systems provide at least two tiers of storage, where upper tiers may provide a short response time and lower tiers may provide relatively longer response times. For example, a fast storage tier may include multiple solid-state drives (SSD), while slower storage tiers may contain multiple hard disk drives (HDD) or tape drives. A slow storage tier may also include cloud storage.

Because faster storage is generally more costly than slower storage, the capacity of faster storage in a typical storage system is usually smaller than that of slower storage. Based primarily on data access frequency, tiered storage management systems may periodically relocate frequently accessed data extents, or other allocation units, to an upper tier and less frequently accessed data extents to a lower tier in order to improve overall performance of the storage system. This "promotion" and "demotion" process is primarily based on the "heat," or I/O workload, of the extents. If an extent is deemed to be sufficiently "hot" to merit promoting it to an upper tier, a data relocator may move, or migrate, the extent to the upper tier. Conversely, if an extent is "cold," the data relocator may migrate it to a lower tier. In such data movement operations, tiered storage management systems generally rely on a "heat map" in deciding which extents to move. A heat map associates a workload activity metric referred to as a "heat value" with, typically, each extent in a logical volume. Tiered storage management systems may use various freely available or proprietary algorithms to compute heat values for a heat map.

A heat value may be a value on a predefined numerical scale and may be interpreted as a temperature, ranging from hot, representing high activity, to cold, representing low activity. For example, a heat value may be an average over the grains (e.g., individual blocks) in an extent of the total number of reads and writes in an interval of time during which I/O activity is monitored. As performance metrics are tracked over time, for example in a 24-hour interval, the heat map is updated and data may be relocated among storage tiers accordingly.

Current tiered storage management systems generally do not consider possible non-uniform distribution of grain level I/O activity when making data migration decisions. A non-uniform workload distribution may occur, for example, if an extent has some grains that are hot while most other grains are cold. A storage policy that, for example, bases migration decisions solely on average I/O workload over grains of extents may overlook cases in which storage performance may be improved by considering such workload non-uniformity.

Embodiments of the present invention are directed to systems for managing tiered data storage that promote or demote extents based on the pattern of workload activity of grains in the extents. In various embodiments, I/O workload is monitored at the grain level and tiering decisions are made based on average heat values of extents and on additional "heat spike indicators," which identify and quantify I/O access patterns that may be concentrated on individual grains or groups of grains. Heat values may be computed according to any of a variety of currently available or contemplated algorithms. Heat spike indicators measure I/O workload non-uniformity and their use may improve storage system performance when the I/O workload is non-uniform with respect to grains of extents.

Various advantages of the present invention may include:
1. Better performance of the system, as non-uniformity of I/O workload is taken into consideration when making storage tiering decisions.
2. Providing grain level granularity for the tiering algorithm. As a result, extents with just a few hot grains may not be demoted due to the coldness of other grains in the same extent, and grains experiencing high I/O workload may be promoted, even if other grains in the same extent are cold.
3. Aiding in "warm demotion," where a hot extent with uniform I/O workload needs to be migrated to a lower tier to avoid SSD degradation due to overloading.
4. Ease of implementation and integration with current tiering code for storage controllers.

In exemplary embodiments of the present invention, a grain is a single block of an extent, I/O workload is monitored at the block level, and tiering decisions are made based on heat values computed for each block of an extent. In various other embodiments of the invention, a grain may consist of multiple blocks and tiering decisions may be made based on heat values that are computed for each grain.

In exemplary embodiments of the present invention, tiered storage managers migrate data between storage tiers in units of extents. In other embodiments, data may be migrated in units that consist of predefined extent groups.

FIG. 1 is a functional block diagram of a storage management system 100, in accordance with certain embodiment of the present invention. Storage management system 100 includes computing device 110, tier 1 storage 120, tier 2 storage 122, and tier 3 storage 124, all interconnected over a network 130. For example, faster storage devices (e.g., solid state drives) may make up a tier 1 storage 120, intermediate performance storage devices (e.g., hard drives) may make up tier 2 storage 122, while slower storage devices (e.g., tape or cloud) may make up tier 3 storage 124. In other embodiments, more than three tiers or as few as two tiers may be present.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between computing device 110 and storage devices 120, 122, and 124, in accordance with embodiments of the present invention.

Figure 7:
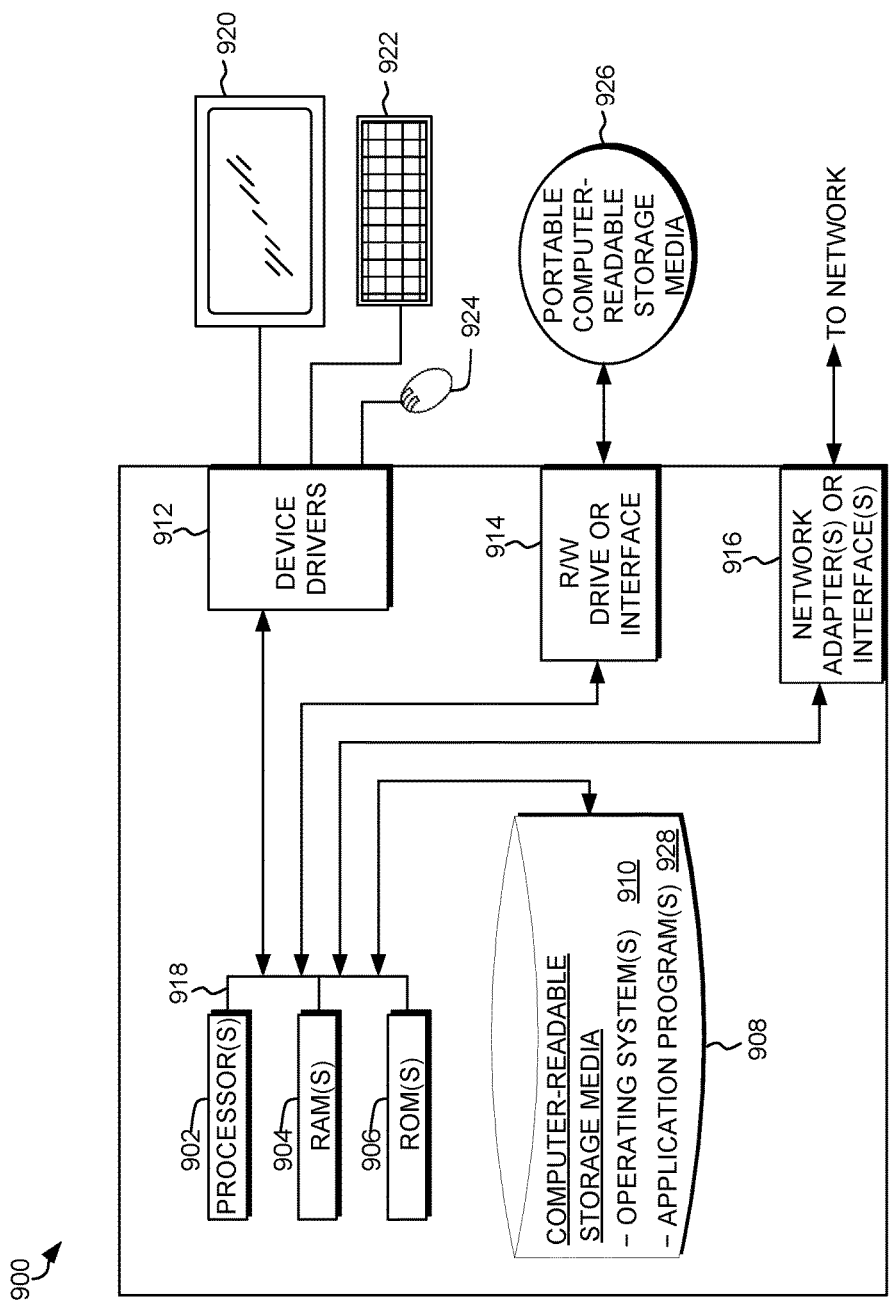
FIG. 7 is a functional block diagram illustrating a data processing environment, in accordance with an embodiment of the present invention.

Computing device 110 represents the computing environment or platform that hosts storage manager 112. In various embodiments, computing device 110 may be a laptop computer, netbook computer, personal computer (PC), a desktop computer, or any programmable electronic device capable of hosting storage manager 112, described below, and communicating with storage devices 120, 122, and 124 via network 130, in accordance with embodiments of the invention. Computing device 110 may include internal and external hardware components, as depicted and described in further detail below with reference to FIG. 7, below. In other embodiments, computing device 110 may be implemented in a cloud computing environment, as described in relation to FIGS. 8 and 9, below.

Figure 9:
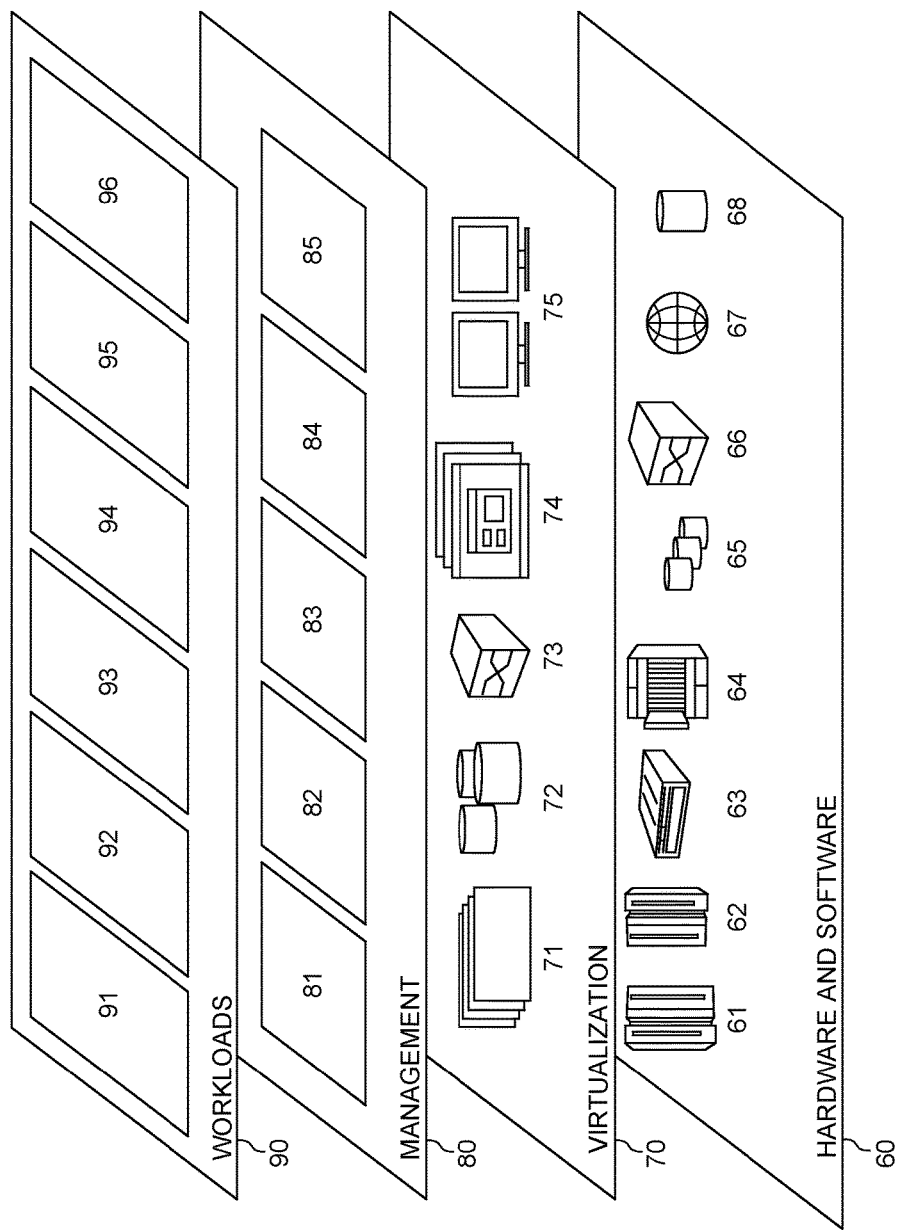
FIG. 9 depicts abstraction model layers, in accordance with an embodiment of the present invention.

Storage manager 112 operates generally to monitor system I/O activity and migrate data between storage tiers, based on frequency of access of system storage devices, in order to improve performance, in accordance with an embodiment of the invention. Storage manager 112 may further include tiered storage management module 114, heat map utilities 116, data relocator 118, and heat datastore 126. Heat datastore 126 may reside, for example, on computer readable storage media 908 (FIG. 7) or storage devices 65 (FIG. 9).

In accordance with an embodiment of the invention, tiered storage management module 114 monitors I/O activity of extents on storage devices such as tier 1 storage 120, tier 2 storage 122, and tier 3 storage 124 and stores monitor data in heat datastore 126. Monitor data may quantify the level of I/O workload activity, over a predefined interval of time, of grains of extents associated with the various storage tiers, as described below. After the predefined monitoring interval, tiered storage management module 114 creates a migration plan, a plan for migrating extents between upper and lower tiers of storage, based on heat maps and other workload performance data generated by heat map utilities 116 from the monitor data. Tiered storage management module 114 may store the migration plan in heat datastore 126 and invoke data relocator 118 to execute the migration plan, while continuing to monitor I/O activity during the next monitoring interval.

I/O workload may be characterized in a variety of ways and may be affected by a number of factors, including random versus sequential I/O, large versus small I/O request size, read versus write ratio, and the degree of parallelism employed. The workload rating of a storage device is typically described via its input/output operations per second (IOPS) capacity, its maximal throughput, or bandwidth, and its latency, the time required to process a storage operation or data request. In embodiments of the invention, monitor data may include, along with the total number of I/O requests during the monitoring interval, the read/write ratio of the requests and the size of each request, so that a decision to migrate data from one storage device to a different type of storage device may be based, in part, on characteristics, such as workload rating, of the respective devices.

In an embodiment of the invention, monitor data may include information related to paging activity, supplied by the operating system (OS). Paging is a method of memory management in which the OS writes data from main memory to secondary storage and reads data from secondary storage for use in main memory.

Heat map utilities 116 operate generally to retrieve I/O workload data for storage devices such as tier 1 storage 120, tier 2 storage 122, and tier 3 storage 124 from heat datastore 126 and generate a heat map for data extents of the storage devices, in accordance with an embodiment of the invention. In one embodiment of the present invention, heat map utilities 116 may compute, in addition to average heat values for heat maps, heat spike indicators, which provide a numerical measure of the non-uniformity of I/O accesses among blocks in a data extent, as described below.

Data relocator 118 operates to migrate data between system storage devices, such as tier 1 storage 120, tier 2 storage 122, and tier 3 storage 124, based on a migration plan created by tiered storage management module 114, in accordance with an embodiment of the invention. Migration of data generally occurs concurrently with monitoring of I/O activity and storing of the monitor data by tiered storage management module 114.

In tiered storage management systems, migration of extents between tiers is typically based primarily on a heat map, which represents average I/O workload levels of extents, and may be used to identify extents that are subject to heavy average workloads. Extents which are accessed more frequently, on average, may be promoted to a faster tier and extents that are accessed less frequently, on average, may be demoted to a lower tier. However, because extents generally contain a large number of blocks, it may happen that part of an extent becomes hot while another part is cold, as compared to another extent for which blocks are accessed with approximately equal frequency. In this scenario, even if average I/O access levels for both of the extents were the same, storage system performance may improve if the first extent, with a few heavily accessed blocks, receives a higher priority for promotion than the second extent, which has a more evenly distributed I/O workload.

Figure 2B:
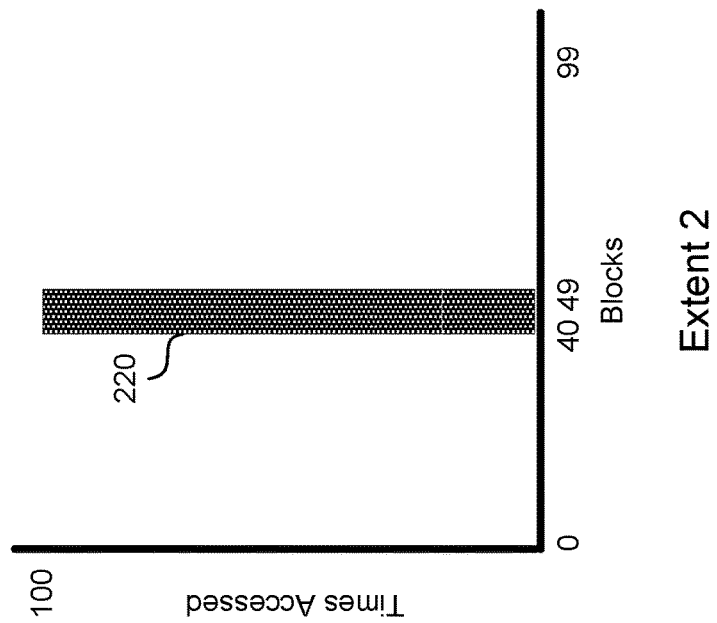
FIGS. 2A and 2B illustrate workload distribution of two example data extents, in accordance with an embodiment of the present invention.
Figure 2A:
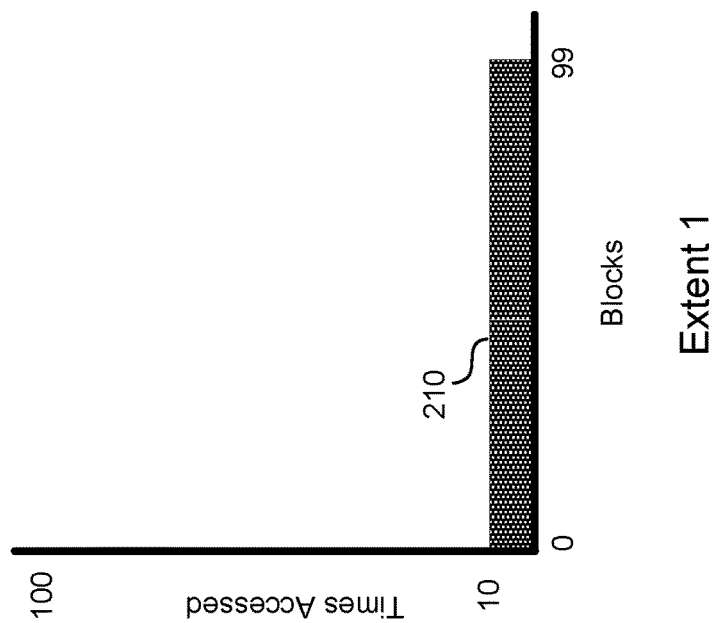

This situation is illustrated in FIGS. 2A and 2B, which show access patterns for two extents, labeled Extent 1 (FIG. 2A) and Extent 2 (FIG. 2B). Extent 1 has 100 blocks 210 labeled 0-99, each of which was accessed 10 times (in a given time interval), and hence the heat map for Extent 1 might show, for example, a value of 1000. Extent 2 also has 100 blocks, of which 10 blocks 220 (labeled 40-49) were accessed 100 times and the remaining blocks were not accessed at all. Hence, the heat map for Extent 2 would also show a 1000. Current tiered storage systems typically treat both the blocks similarly, since, on average, blocks in both extents were accessed with the same frequency. In embodiments of the present invention, the disparity in workload distribution would cause Extent 2 to be a selected over Extent 1 as a candidate for promotion to a higher tier.

For LBA ranges with areas of high I/O concentration, latency may increase if the system needs to perform I/O on the same LBA range, possibly queueing up more I/O for a single device. Latency is less of a problem when an extent has an I/O workload that is approximately evenly distributed over the LBA range. Thus, from the application perspective, it would be advantageous if an extent with areas of high I/O concentration is prioritized for promotion, compared to an extent with more or less uniform I/O activity.

The same situation exists for extent demotion. If an extent has a non-uniform I/O workload distribution, such as Extent 2 in FIG. 2B, and it is moved to a lower tier, then an application accessing this extent may face higher latency times. This might have been avoided if the extent with evenly distributed I/O, such as Extent 1 in FIG. 2A, were prioritized as a better candidate for demotion. Embodiments of the present invention may reduce such consequences by employing a tiering algorithm that heeds situations in which certain blocks in an extent are hot and the rest are cold.

In various embodiments of the invention, mean heat values for extents are enhanced with additional heat spike indicators, which provide a measure of the non-uniformity of I/O accesses among blocks in an extent. Heat spike indicators may be calculated in various ways, in accordance with embodiments of the invention. Heat spike indicators signal the prevalence of heat spikes in the pattern of I/O activity for blocks in a particular extent. Heat spike indicators may also include the magnitude of heat spikes, for example, the height of a spike above the mean heat value for the extent. The magnitude of a heat spike indicates how much the corresponding block may be overloaded compared to other blocks in the same extent. When executing a migration plan, the storage manager may include heat spike indicators when considering which candidates to select for promotion or demotions.

If an extent exhibits pronounced heat spikes, indicating heavy I/O activity on only certain blocks, or other grains, in the extent, then embodiments of the present invention identify heat spikes, record their number and deviation from mean heat value, and save heat spike indicators along with the heat map for the extent. The storage manager then takes the heat spike indicators into account when generating a migration plan. In particular, if two extents with substantially the same average heat are candidates for promotion, then the one with higher heat spike indicator values may receive a higher priority for migration, since moving the hot blocks in the extent to a higher storage tier may improve performance. Similarly, if two extents with the same average heat are candidates for demotion, the one with fewer and/or lower heat spikes, indicating that the I/O workload is more balanced across the extent, could be demoted to a lower tier.

Heat spike data can be computed in several ways, as discussed below. By using a granular I/O workload metric and block heat comparison, after detecting spikes in the I/O workload, in making decisions about extent movement, storage system performance may be improved, as heavily used blocks in extents may not be overlooked for promotion due to the coldness of other blocks in the extent.

Figures 3A, 3B:
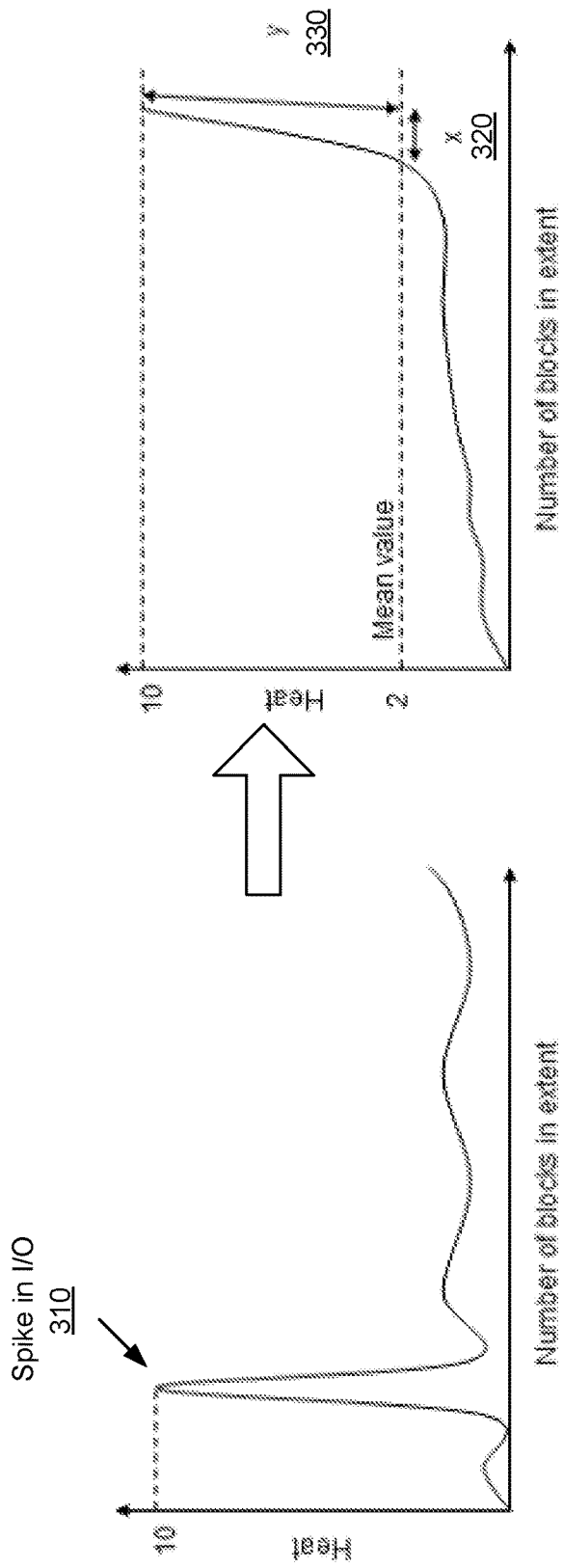
FIG. 3A illustrates temperature distribution of blocks in a data extent, in accordance with an embodiment of the present invention.
FIG. 3B illustrates temperature distribution of blocks in the data extent of FIG. 3A after sorting, in accordance with an embodiment of the present invention.

For example, FIG. 3A is a graph depicting heat values of blocks in an example extent. The blocks exhibit different levels of I/O activity, or heat, and at least one heat spike 310 is present, with a heat value of 10. FIG. 3B illustrates how one heat spike indicator could be defined, in accordance with an embodiment of the invention. In FIG. 3B, the blocks are sorted by increasing heat value to illustrate how a spike heat indicator could be calculated, in one embodiment of the invention. A mean heat value (2, in this case) is shown. The value x 320 is the number of blocks whose heat values are greater than the mean heat value. The value y 330 is the difference of the largest heat value and the mean heat value. The quotient y/x serves as a heat spike indicator. Various steps in computing this heat spike indicator are discussed below in reference to FIG. 5.

The temperature of individual grains in an extent may provide an indicator as to whether an extent I/O activity concentrated on a single grain or group of grains, or a pattern of I/O activity that is more evenly distributed across the extent. However, the smaller the grain, the more temperature data needs to be recorded and processed. In an embodiment of the invention, the size of a grain may be configured for the purpose of generating heat values. Alternatively, heat values may be calculated for a predefined number of grains in an extent. The size or number of grains selected may be based, for example, on the size of the areas of high I/O concentration that need to be identified in order to enhance system performance.

Figure 4:
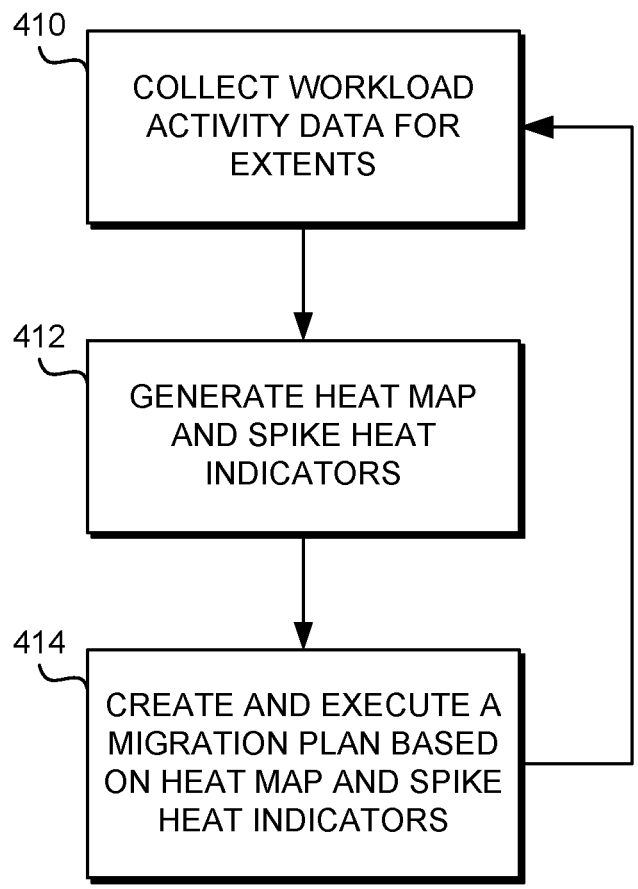
FIG. 4 is a high-level flowchart depicting various operational steps in a tiered storage management program, in accordance with an embodiment of the present invention.

FIG. 4 is a flowchart depicting operational steps of storage manager 112, in accordance with an exemplary embodiment of the invention. Tiered storage management module 114 monitors data accesses to storage devices 120, 122, and 124 and stores workload activity data for extents in heat datastore 126 (step 410). Heat map utilities 116 generates a heat map and spike heat indicators, based on the stored workload data in heat datastore 126 (step (412). Heat map utilities may also store the heat map and spike heat indicators in heat datastore 126. After a predetermined interval of time, tiered storage management module 114 creates a migration plan based on the stored heat map and spike heat indicators (step 414), and causes data relocator 118 to execute the plan. During execution of the migration plan, tiered storage management module 114 continues to monitor data accesses to storage devices 120, 122, and 124 and to store workload activity data for extents in heat datastore 126. The process of collecting workload activity data, generating a heat map and spike heat indicators, and creating and executing a migration plan repeats while the storage manager is active.

Two embodiments of the invention are discussed below, with reference to FIGS. 5 and 6. In both cases, decisions to promote or demote an extent are based both on an average heat value for the extent and a computed value called spike heat. Spike heat is a measure of non-uniformity of the heat values of blocks in the extent. In general, if two extents have substantially the same average heat value, based on a predefined threshold, then the extent with a greater value of spike heat may be a better choice for promotion to an upper tier. Similarly, if two extents have substantially the same average heat value, then the extent with a lesser spike heat indicator may be a better choice for demotion to a lower tier.

For example, in an embodiment of the invention, if the respective average heat values of two or more extents that are candidates for promotion or demotion differ by less than a predefined threshold, then the migration plan created by tiered storage management module 114 may specify that extents with the highest spike heat values be promoted first and extents with the lowest spike heat values be demoted first. In an embodiment of the invention, tiered storage management module 114 may assign to extents that have substantially the same average heat value (based on a predefined threshold) promotion priorities that are proportional to their respective spike heat values and demotion priorities that are inversely proportional to their respective spike heat values. Extents may then be promoted or demoted according to these priorities.

Figure 5:
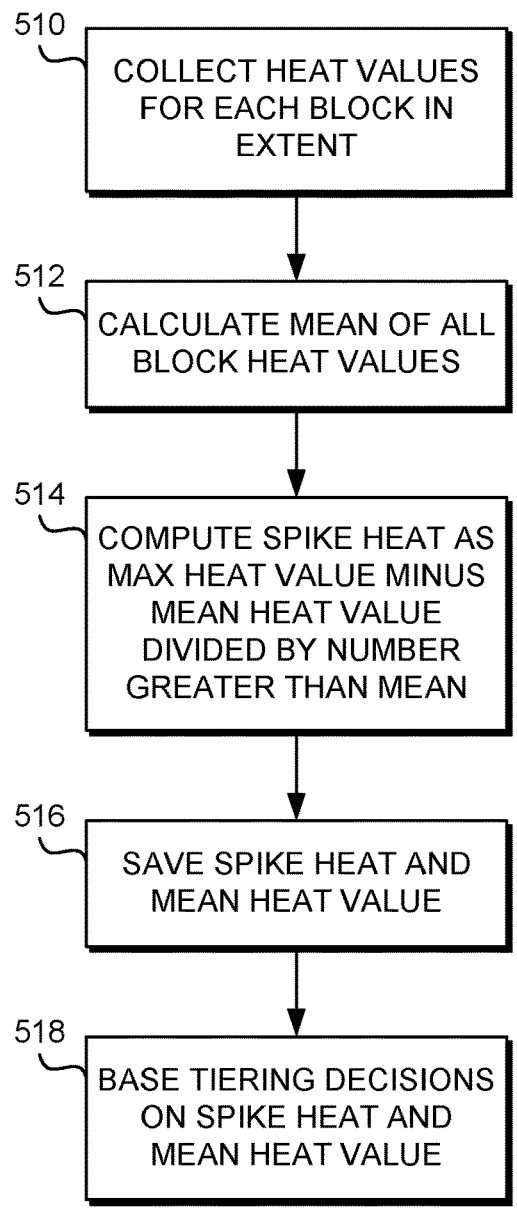
FIG. 5 is a flowchart depicting various operational steps in a tiered storage management program, in accordance with an exemplary embodiment of the present invention.

FIG. 5 depicts various steps in managing tiered storage, in accordance with an exemplary embodiment of the invention. In this embodiment, tiered storage management module 114 monitors I/O activity at the level of blocks in the extent, while the unit of data movement is an extent. The purpose of keeping the unit of movement an extent is to make the embodiment compatible with current implementations of tiering mechanisms in storage controllers. However, in other embodiments, smaller units of movement, such as individual blocks or groups of blocks, may be used. Various steps in this approach are:

1. For a given extent, tiered storage management module 114 collects the heat values of all blocks in the extent in an array, for example, HEAT_BLOCKS[0 . . . n−1], where n is the number of blocks in the extent (step 510).
2. Heat map utilities 116 calculates the mean of the heat values in array HEAT_BLOCKS in a variable MEAN (step 512).
3. Heat map utilities 116 computes the spike heat indicator SPIKE_HEAT=max{HEAT_BLOCK]0 . . . n−1]−MEAN}/(# blocks with heat values above MEAN) (step 514).
4. Heat map utilities 116 saves SPIKE_HEAT and MEAN in a heat map in heat datastore 126 (step 516).
5. Tiered storage management module 114 bases tiering decisions on the saved values of SPIKE_HEAT and the corresponding values of MEAN in the heat map (step 518).

For a given mean heat value, a larger value of the spike heat indicator SPIKE_HEAT for a given extent corresponds to a greater maximum heat value and/or a smaller number of blocks with heat values above the mean. This may indicate the presence of significant heat spikes, i.e., a small number of blocks in the extent that are experiencing a heavy I/O workload.

In various embodiments of the invention, other spike heat indicators may be computed. For example, statistical variance may be used to measure the variability of the heat values. Alternatively, the consecutive heat values may be processed to generate a smooth function approximation to the heat data and use known methods of peak detection based on calculus. For example, second derivatives or variations in first derivative values may be used to identify heat spikes.

Figure 6:
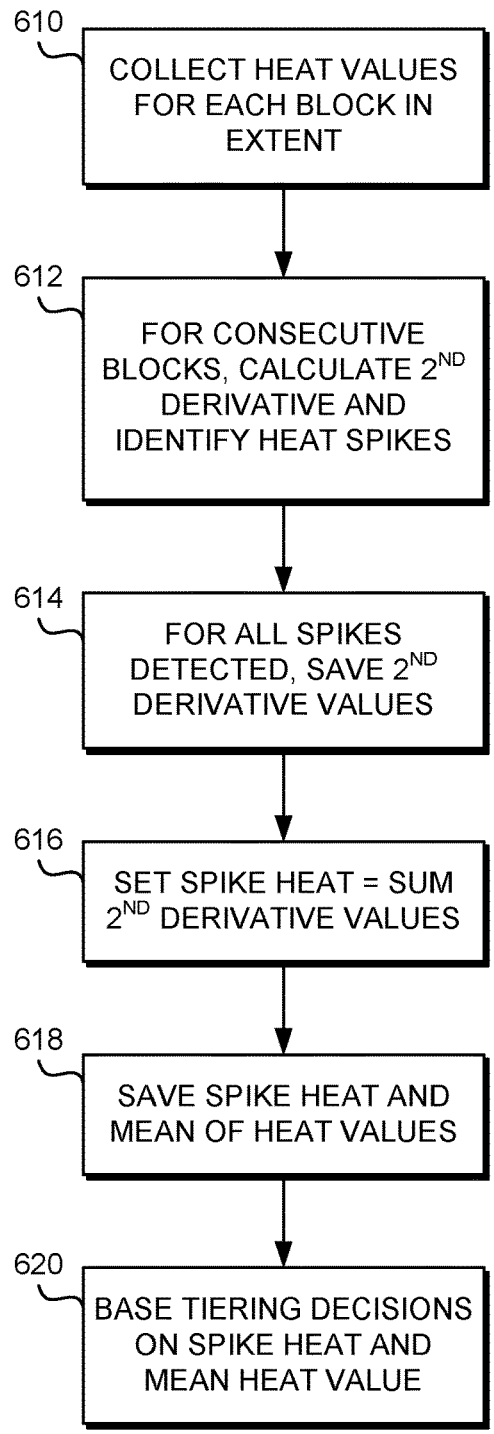
FIG. 6 is a flowchart depicting various operational steps in a tiered storage management program, in accordance with an alternative embodiment of the present invention.

FIG. 6 depicts various steps in managing tiered storage, in accordance with an alternative embodiment of the invention. In this embodiment, calculus is used to identify heat spikes, by computing a second derivative. If the pattern of I/O activity is relatively smooth with respect to successive blocks in an extent, for example, for a sequential I/O device such as a tape unit, then second derivatives may be used to calculate a rate of change of heat across blocks, and spikes may be detected in this way. Alternatively, heat values may be interpolated or approximated to construct a smooth function that may be differentiated. Spikes correspond to large negative values of the second derivative and may be identified by comparing the second derivative values to a predefined threshold. Once heat spikes are identified, the corresponding heat values can be recorded. Steps in this approach include:

1. Tiered storage management module 114 collect the heat values of all blocks inside the extent in an array, for example, HEAT_BLOCKS[0 . . . n−1], where n is number of blocks in the extent (step 610).
2. Heat map utilities 116 uses second derivative values of consecutive blocks to identify heat spikes (step 612) and stores the second derivative values of identified spikes in an array SPIKES_IN_EXTENT[ ] (step 614).

3. Heat map utilities 116 determines the severity all the heat spikes in the extent by summing all the values in SPIKES_IN_EXTENT[ ] in a variable SPIKE_HEAT (step 616):

$$SPIKE\_HEAT = \sum_{i=0}^{n-1} SPIKES\_IN\_EXTENT[i]$$

4. Heat map utilities 116 saves the spike heat indicator SPIKE_HEAT and the corresponding value of MEAN in heat datastore 126 (step 618).
5. Tiered storage management module 114 bases tiering decisions on the saved values of SPIKE_HEAT and the corresponding values of MEAN in the heat map (step 620).

A large value of the spike heat indicator SPIKE_HEAT indicates that the sum of second derivative values for the spikes is large, which may signal the presence of significant spikes among the heat values of blocks in the extent, i.e., that a small number of blocks in the extent are experiencing a heavy I/O workload.

The present invention may be a system, a method, and/or a computer program product at any possible technical detail level of integration. The computer program product may include a computer readable storage medium (or media) having computer readable program instructions thereon for causing a computer processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
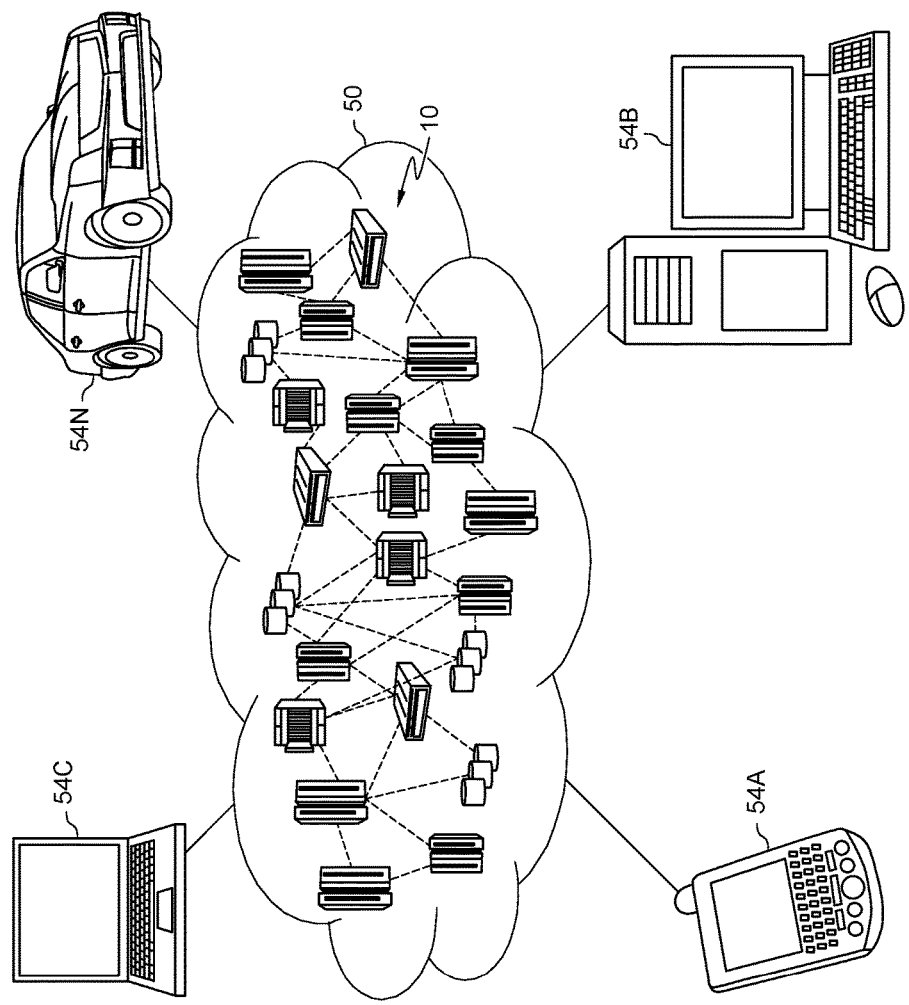
FIG. 8 depicts a cloud computing environment, in accordance with an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage management 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for migrating data in a tiered storage system to improve system performance, the method comprising:
  recording, by the computer, I/O activity of one or more subunits of one or more storage units of one or more storage devices of the tiered storage system;
  for one or more storage units:
    calculating, by the computer, from the recorded I/O activity, a mean heat value over the one or more subunits of a storage unit; and
    calculating, by the computer, from the recorded I/O activity, a spike heat indicator;
  identifying, by the computer, two or more storage units in a tier with respective mean heat values that differ at most by a predefined threshold; and
  migrating, by the computer, to another tier, the storage unit of the two or more storage units that has a greater spike heat indicator.

2. The method of claim 1, wherein the spike heat indicator of a storage unit is a quotient of a maximal heat value of subunits in the storage unit minus the mean heat value of the storage unit to a number of subunits in the storage unit with heat value above the mean heat value of the storage unit.

3. The method of claim 1, wherein calculating the spike heat indicator of a storage unit comprises:
  smoothing consecutive heat values of subunits in the storage unit by approximating the heat values with a smooth function;
  performing peak detection to identify peaks in the smoothed consecutive heat values; and
  computing spike heat indicators by summing magnitudes of second derivatives at the identified peaks or magnitudes of variations of first derivatives at the identified peaks.

4. The method of claim 1, wherein the one or more storage units are selected from a list consisting of: extents and grains.

5. The method of claim 1, wherein the heat values are calculated for a predefined number of subunits in a storage unit.

6. The method of claim 1, wherein the size of one or more storage units is configured for the purpose of generating heat values.

7. The method of claim 1, wherein the recorded I/O activity of one or more subunits of a storage unit of a storage device of the tiered storage system comprises a total number of I/O requests during a predefined time interval for the storage unit.

8. A computer system for migrating data in a tiered storage system to improve system performance, the computer system comprising:
  one or more computer hardware processors, one or more computer-readable storage media, and program instructions stored on one or more of the computer-readable storage media, which when executed cause at least one of the one or more computer hardware processors to perform a method comprising:

recording, by the computer, I/O activity of one or more subunits of one or more storage units of one or more storage devices of the tiered storage system;

for one or more storage units:
- calculating, by the computer, from the recorded I/O activity, a mean heat value over the one or more subunits of a storage unit; and
- calculating, by the computer, from the recorded I/O activity, a spike heat indicator;
- identifying, by the computer, two or more storage units in a tier with respective mean heat values that differ at most by a predefined threshold; and
- migrating, by the computer, to another tier, the storage unit of the two or more storage units that has a greater spike heat indicator.

9. The computer system of claim 8, wherein the spike heat indicator of a storage unit is a quotient of a maximal heat value of subunits in the storage unit minus the mean heat value of the storage unit to a number of subunits in the storage unit with heat value above the mean heat value of the storage unit.

10. The computer system of claim 8, wherein calculating the spike heat indicator of a storage unit comprises:
- smoothing consecutive heat values of subunits in the storage unit by approximating the heat values with a smooth function;
- performing peak detection to identify peaks in the smoothed consecutive heat values; and
- computing spike heat indicators by summing magnitudes of second derivatives at the identified peaks or magnitudes of variations of first derivatives at the identified peaks.

11. The computer system of claim 8, wherein the one or more storage units are selected from a list consisting of: extents and grains.

12. The computer system of claim 8, wherein the heat values are calculated for a predefined number of subunits in a storage unit.

13. The computer system of claim 8, wherein the size of one or more storage units is configured for the purpose of generating heat values.

14. The computer system of claim 8, wherein the recorded I/O activity of one or more subunits of a storage unit of a storage device of the tiered storage system comprises a total number of I/O requests during a predefined time interval for the storage unit.

15. A computer program product for migrating data in a tiered storage system to improve system performance, the computer program product comprising: one or more computer-readable storage media and program instructions stored on the one or more computer-readable storage media, the program instructions, when executed by a computer, cause the computer to perform a method comprising:

recording, by the computer, I/O activity of one or more subunits of one or more storage units of one or more storage devices of the tiered storage system;

for one or more storage units:
- calculating, by the computer, from the recorded I/O activity, a mean heat value over the one or more subunits of a storage unit; and
- calculating, by the computer, from the recorded I/O activity, a spike heat indicator;
- identifying, by the computer, two or more storage units in a tier with respective mean heat values that differ at most by a predefined threshold; and
- migrating, by the computer, to another tier, the storage unit of the two or more storage units that has a greater spike heat indicator.

16. The computer program product of claim 15, wherein the spike heat indicator of a storage unit is a quotient of a maximal heat value of subunits in the storage unit minus the mean heat value of the storage unit to a number of subunits in the storage unit with heat value above the mean heat value of the storage unit.

17. The computer program product of claim 15, wherein calculating the spike heat indicator of a storage unit comprises:
- smoothing consecutive heat values of subunits in the storage unit by approximating the heat values with a smooth function;
- performing peak detection to identify peaks in the smoothed consecutive heat values; and
- computing spike heat indicators by summing magnitudes of second derivatives at the identified peaks or magnitudes of variations of first derivatives at the identified peaks.

18. The computer program product of claim 15, wherein the one or more storage units are selected from a list consisting of: extents and grains.

19. The computer program product of claim 15, wherein the heat values are calculated for a predefined number of subunits in a storage unit.

20. The computer program product of claim 15, wherein the size of one or more storage units is configured for the purpose of generating heat values.

* * * * *